(12) United States Patent
Lavoie (10) Patent No.: US 10,494,171 B2
(45) Date of Patent: Dec. 3, 2019

(54) CONTAINER SYSTEM WITH LIFT INTERFACE DEVICE AND VEHICLE

(71) Applicant: MOVEX INNOVATION INC., Shawinigan, Québec (CA)

(72) Inventor: Fabien Lavoie, Shawinigan (CA)

(73) Assignee: Fabien Lavoie, Shawinigan (CA)

( * ) Notice: Subject to any disclaimer, the term of this patent is extended or adjusted under 35 U.S.C. 154(b) by 63 days.

(21) Appl. No.: 14/398,872

(22) PCT Filed: May 6, 2013

(86) PCT No.: PCT/CA2013/050348
§ 371 (c)(1),
(2) Date: Nov. 4, 2014

(87) PCT Pub. No.: WO2013/163767
PCT Pub. Date: Nov. 7, 2013

(65) Prior Publication Data
US 2015/0117996 A1    Apr. 30, 2015

Related U.S. Application Data

(60) Provisional application No. 61/642,746, filed on May 4, 2012.

(51) Int. Cl.
*B65D 88/12* (2006.01)
*B65D 90/14* (2006.01)
*B60P 1/64* (2006.01)

(52) U.S. Cl.
CPC .............. *B65D 88/123* (2013.01); *B60P 1/64* (2013.01); *B65D 90/14* (2013.01)

(58) Field of Classification Search
CPC ...... B65D 88/123; B65D 88/12; B65D 90/14; B60P 1/64; B60P 1/6418; B60P 1/649; B60P 1/6445

(Continued)

(56) References Cited

U.S. PATENT DOCUMENTS 3,902,616 A * 9/1975 Santic ................ B60P 1/34
  298/11
5,427,495 A * 6/1995 Vlaanderen ........... B60P 1/6463
  414/498

(Continued)

FOREIGN PATENT DOCUMENTS

| EP | 1357232 A2 | 10/2003 |
| FR | 2702751 A1 | 9/1994 |
| GB | 2442220 A | 4/2008 |

*Primary Examiner* — Saul Rodriguez
*Assistant Examiner* — Ashley K Romano
(74) *Attorney, Agent, or Firm* — Norton Rose Fulbright Canada LLP (57) ABSTRACT

A lift interface device for releasably coupling a vehicle to a container, the vehicle of the type engaging the container through a passage under the container, the lift interface device comprises a base adapted to be secured to the vehicle. A frame is positioned over the vehicle and connected to the base with at least a rotational joint adjacent to a leading end of the lift interface device, such that the frame is movable from a coupling orientation to a raised orientation, the frame comprising at least one support surface for supporting the container when the frame is rotated toward the raised configuration, and a container connector at a trailing end of the lift interface device adapted to be used for releasably connecting the container to the frame when the frame is rotated toward the raised configuration; and an actuation unit to rotate and hold the frame relative to the base at desired orientations between the coupling orientation and the raised orientation.

22 Claims, 11 Drawing Sheets (58) Field of Classification Search
USPC .......................................................... 414/469
See application file for complete search history.

(56) References Cited

U.S. PATENT DOCUMENTS

| | | | |
|---|---|---|---|
| 5,836,657 A | 11/1998 | Tilley et al. | |
| 7,033,128 B2* | 4/2006 | Poindexter | B60P 1/4414 |
| | | | 414/522 |
| 7,037,062 B2* | 5/2006 | Oliver | B60P 1/6454 |
| | | | 414/478 |
| 8,157,316 B1 | 4/2012 | Bartel | |
| 8,403,617 B2 | 3/2013 | Banning | |
| 2004/0156703 A1* | 8/2004 | Benedikt | B60P 3/42 |
| | | | 414/498 |
| 2008/0112786 A1* | 5/2008 | Deist | B60P 3/42 |
| | | | 414/498 |

* cited by examiner

CONTAINER SYSTEM WITH LIFT INTERFACE DEVICE AND VEHICLE

CROSS-REFERENCE TO RELATED APPLICATION

The present application claims priority on U.S. Provisional Patent Application No. 61/642,746, filed in May 4, 2012, and incorporated herewith by reference.

FIELD OF THE APPLICATION

The present application relates to a system of vehicle and containers such as bins, bulk-material containers, waste disposal units, of relatively large size, and to a lift interface device for displacing these containers with the vehicle.

BACKGROUND OF THE ART

It is often required to employ relatively large containers for various uses: waste disposal, storage and transport of materials such as bulk material, etc. However, such large containers are difficult to maneuver. Some motorized containers have been developed to facilitate their maneuvering. However, each said motorized container may be costly, notably due to the presence of motorization on each of the container units.

SUMMARY OF THE APPLICATION

It is therefore an aim of the present disclosure to provide a novel motorized container system.

Therefore, in accordance with the present application, there is provided a lift interface device for releasably coupling a vehicle to a container, the vehicle of the type engaging the container through a passage under the container, the lift interface device comprising: a base adapted to be secured to the vehicle; a frame positioned over the vehicle and connected to the base with at least a rotational joint adjacent to a leading end of the lift interface device, such that the frame is movable from a coupling orientation to a raised orientation, the frame comprising at least one support surface for supporting the container when the frame is rotated toward the raised configuration, and a container connector at a trailing end of the lift interface device adapted to be used for releasably connecting the container to the frame when the frame is rotated toward the raised configuration; and an actuation unit to rotate and hold the frame relative to the base at desired orientations between the coupling orientation and the raised orientation.

Still further in accordance with the present disclosure, the frame comprises a pair of longitudinal vertical walls spaced apart by transverse members.

Still further in accordance with the present disclosure, the at least one support surface is a top edge surface of each of the longitudinal vertical walls.

Still further in accordance with the present disclosure, support flanks project laterally from the longitudinal vertical walls, the support flanks included in the at least one support surface.

Still further in accordance with the present disclosure, an undersurface of the support flanks is coplanar with a top surface of the vehicle in the coupling orientation.

Still further in accordance with the present disclosure, the support flanks are each part of an integral metal piece with one of the longitudinal vertical walls.

Still further in accordance with the present disclosure, an inner volume is defined between the longitudinal vertical walls, the inner volume accommodating at least a substantial portion of the base and of the actuation unit in the coupling orientation.

Still further in accordance with the present disclosure, a width of the frame is at a ratio between 2.78 and 3.75 to a width of the vehicle.

Still further in accordance with the present disclosure, the frame has a width of 8 ⅞"±1".

Still further in accordance with the present disclosure, an alignment head is at the leading end of the lift interface device, the alignment head having a body narrowing in the leading direction and adapted to contact a channel of the container for the frame to align with the channel.

Still further in accordance with the present disclosure, the alignment head is connected to the frame.

Still further in accordance with the present disclosure, the container connector is a tab with a hole.

Still further in accordance with the present disclosure, the tab is above a plane of the at least one support surface.

Still further in accordance with the present disclosure, the tab is a trailing-most member of the lift interface device.

Still further in accordance with the present disclosure, the actuation unit comprises a hydraulic cylinder with a hydraulic network and pump, the base, the hydraulic cylinder, the hydraulic network and the pump being substantially accommodated in an inner volume of the frame.

Still further in accordance with the present disclosure, the base is adapted to be releasably secured to a top surface of the vehicle.

Further in accordance with the present disclosure, there is provided a container system comprising the lift interface device as described above; a vehicle supporting the lift interface device; and at least one container having a receptacle portion and legs projecting downwardly from the receptacle portion to define a passage for the vehicle to be displaced under the receptacle container, an undersurface of the receptacle portion defining a channel aligned with the passage for receiving a portion of the lift interface device in the coupling orientation when the vehicle is displaced in a leading direction, the container comprising a lift connector for cooperation with the container connector of the frame.

Still further in accordance with the present disclosure, the vehicle is a motorized crawler.

Still further in accordance with the present disclosure, the motorized crawler has a top planar surface, and the base of the lift interface device is releasably secured to the top planar surface.

Still further in accordance with the present disclosure, the actuation unit of the lift interface device is powered by a power source of the motorized crawler.

Still further in accordance with the present disclosure, the lift connector is at least one connector tab with a hole, the lift connected being located at a trailing end of the channel in the receptacle portion.

Still further in accordance with the present disclosure, the connector tab of the lift connector is above an uppermost horizontal surface of the channel, and the tab of the container connector is above a plane of the at least one support surface of the frame.

Still further in accordance with the present disclosure, a pin is releasably engaged in the holes of the connector tabs of the container connector and of the lift connector.

Still further in accordance with the present disclosure, the lift connector on the container has a pair of the connector tabs spaced apart from one another to form a gap, with the connector tab of the lift interface device entering said gap by movement in the leading direction.

Still further in accordance with the present disclosure, the legs of the container remain on the ground when the vehicle is in the passage and the lift interface device is in its coupling orientation, when the container system is on a substantially planar surface.

Still further in accordance with the present disclosure, a sensor unit indicates when the container is raised off the ground by the lift interface device for the vehicle to transport the container.

Still further in accordance with the present disclosure, a plurality of the containers for a single one of the vehicle with the lift interface device thereon.

Still further in accordance with the present disclosure, the raised orientation has the frame at an angle of 62 degrees relative to a top planar surface of the vehicle.

Still further in accordance with the present disclosure, the vehicle has a height of 13 ½"±1 ½" from the ground.

BRIEF DESCRIPTION OF THE DRAWINGS

FIG. 10 is a perspective view of the container system of FIG. 9 with a plurality of containers stacked into one another;

DESCRIPTION OF THE PREFERRED EMBODIMENTS

Figure 3:
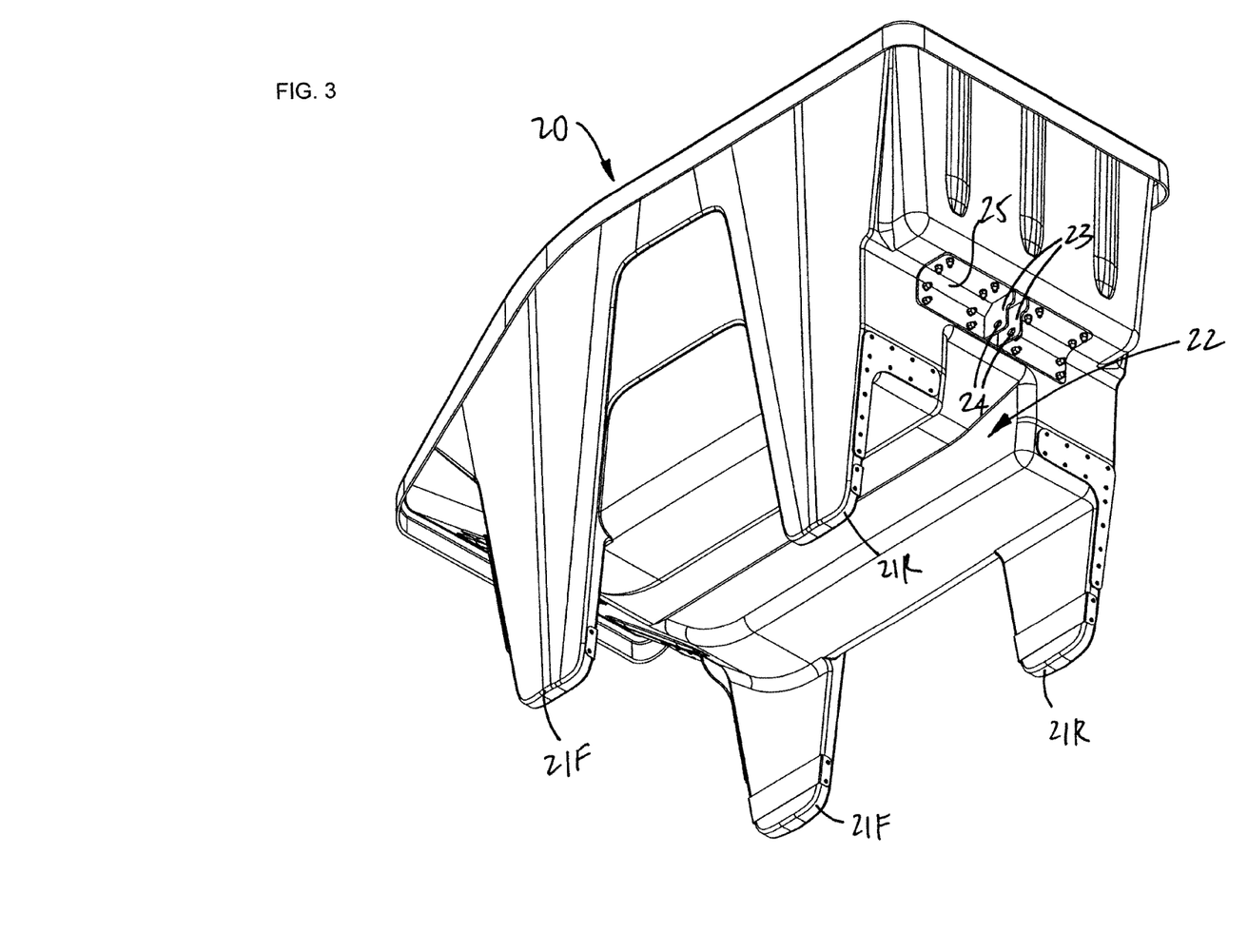
FIG. 3 is an underside perspective view of the container of FIG. 1, from the trailing end.
Figure 4:
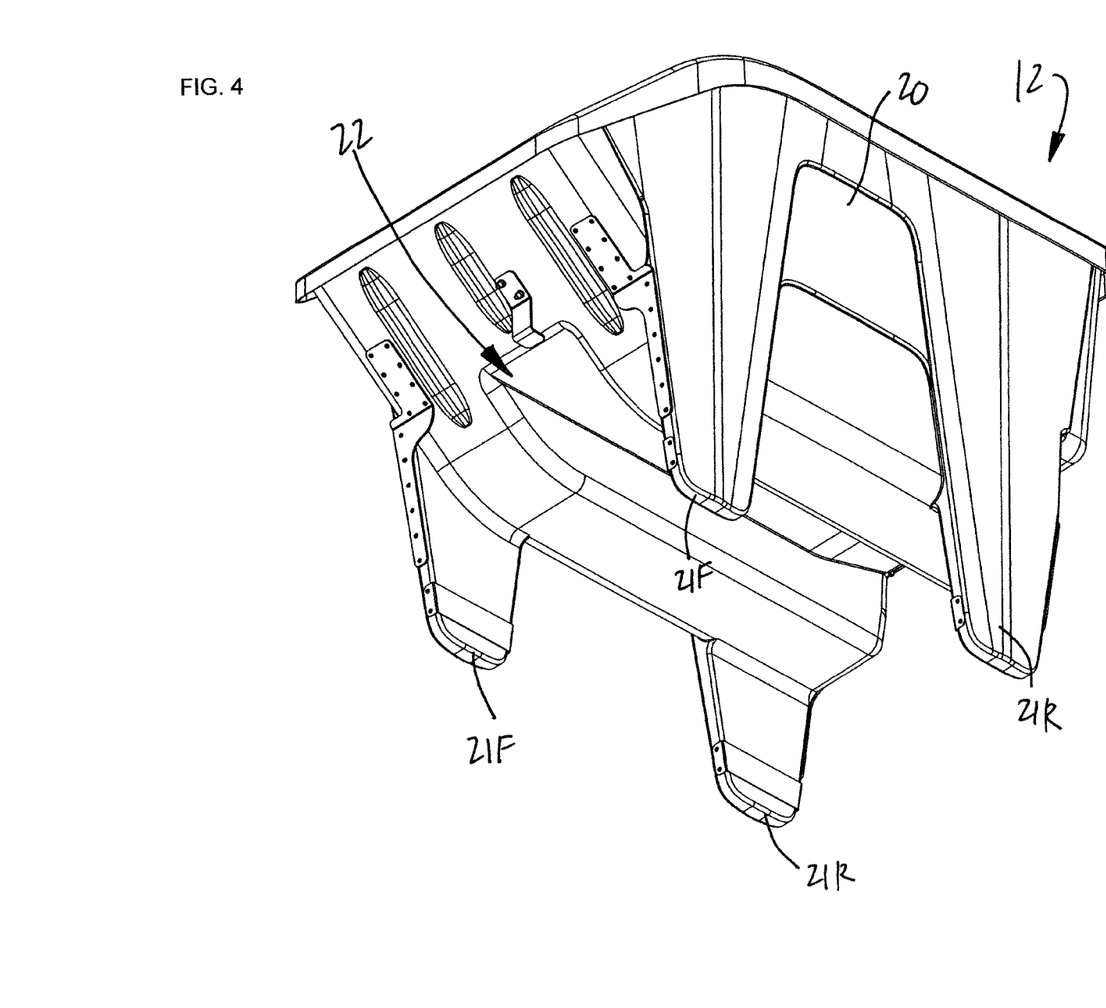
FIG. 4 is an underside perspective view of the container of FIG. 1, from the leading end.
Figure 5:
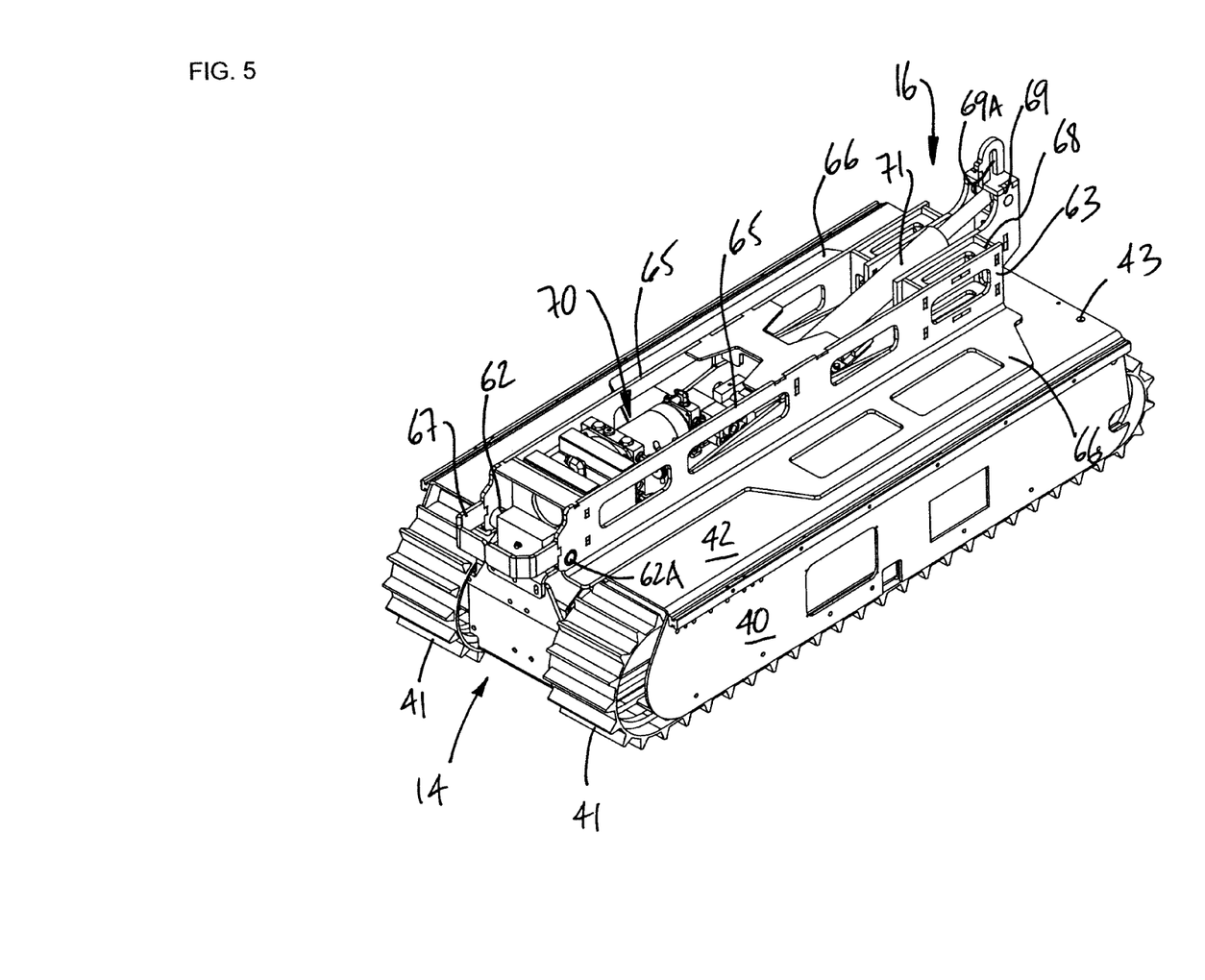
FIG. 5 is a perspective view of a vehicle with lift interface device of the motorized container system of FIG. 1, from a leading end and with the lift interface device in a coupling orientation.

Referring to the drawings, and more particularly to FIGS. 3-5, a motorized container system in accordance with an embodiment of the present disclosure is generally shown at 10. The container system 10 comprises one or numerous containers 12, a vehicle 14 (a.k.a., crawler, endless track unit, tracked unit, hand truck, carriage, cart, barrow, buggy, etc), and a lift interface device 16.

The container 12 may be any type of container, receptacle, bin, waste disposal unit, pallet, table or the like that is used to carry materials such as waste, construction materials in bulk or packaged format, etc, or equipment. The container 12 may have shelves or any appropriate configuration as a function of its use. The container 12 may be made of any appropriate materials, such as plastics and/or metals. In an embodiment, the container 12 is made of a molded plastic, such as polyethylene.

The vehicle 14 is used to carry containers 12, and may be motorized as in the Figs., or may be manually operated. The vehicle 14 may be similar to that described in US Patent Application Publication No. US2005129493, incorporated herewith by reference. It is however noted that the vehicle 14 as illustrated in the present application features two different endless tracks with the endless tracks being selectively operable in different directions so as to allow the vehicle 14 to rotate and turn.

The lift interface device 16 is on the vehicle 14 and is used to interface and connect the container 12 to the vehicle 14, and tilt the container 12, to a discharge orientation.

Figure 1:
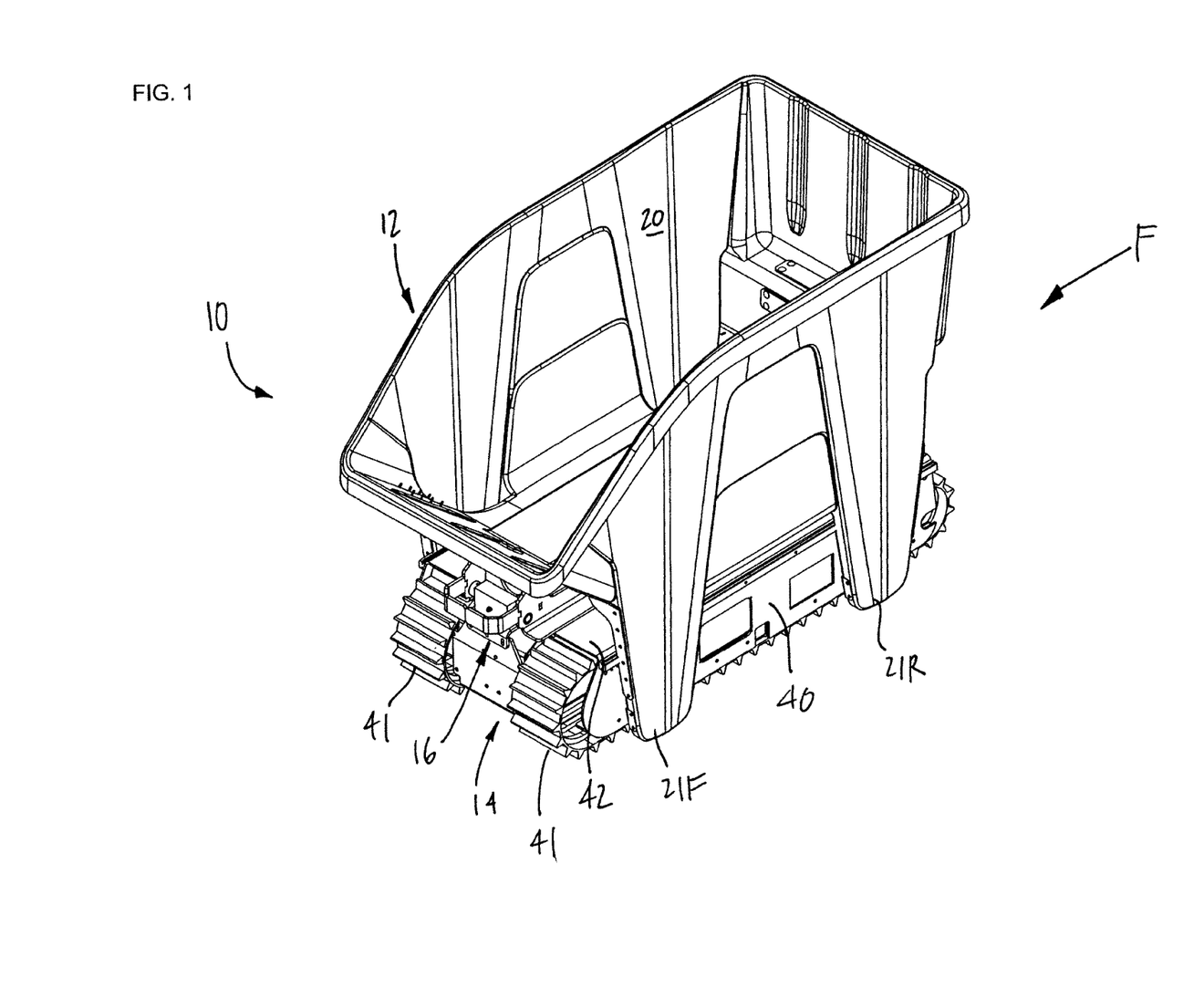
FIG. 1 is a perspective view of a motorized container system with a container thereon for carrying, from a leading end, in accordance with the present disclosure of the present disclosure.
Figure 2:
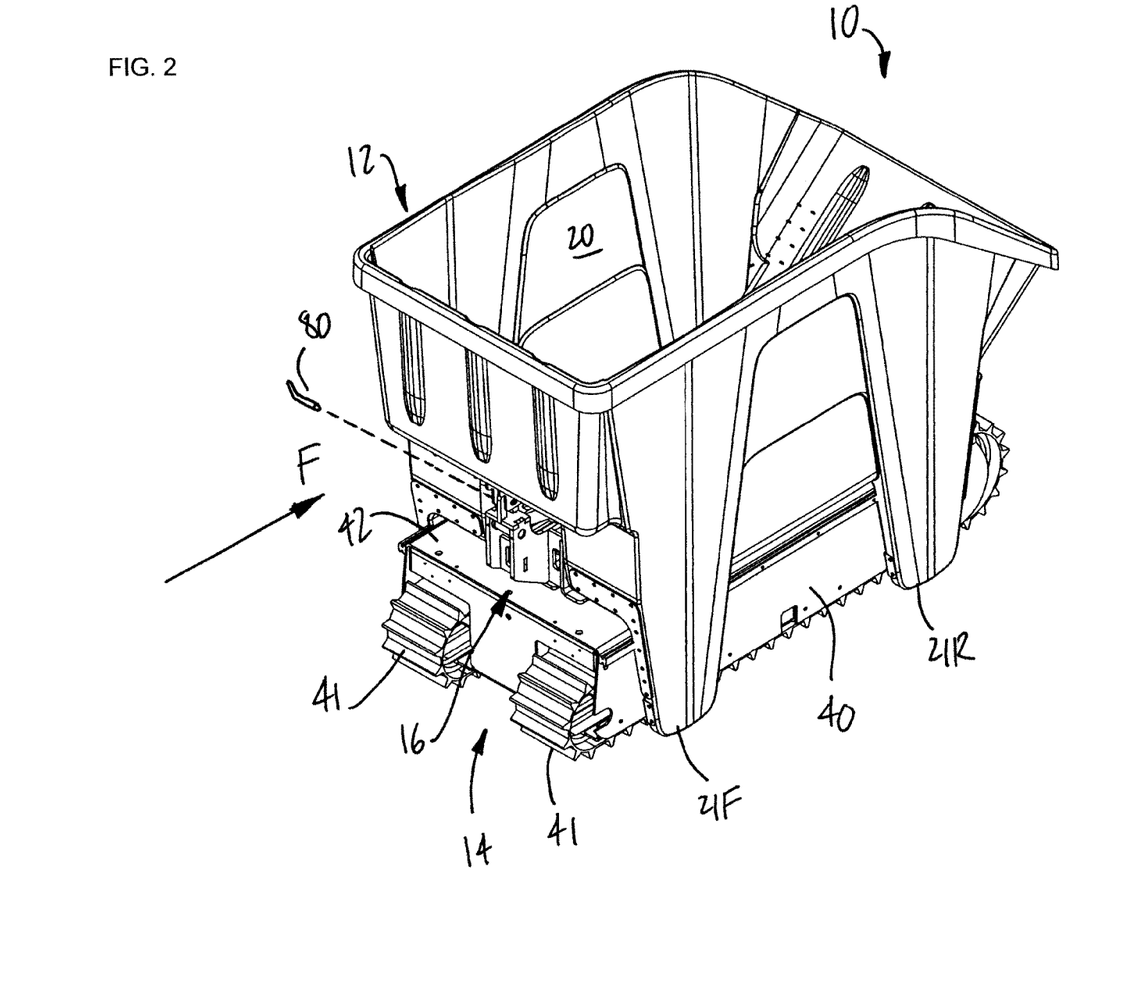
FIG. 2 is a perspective view of the motorized container system with the container thereon as in FIG. 1, from a trailing end.

Referring concurrently to FIGS. 1 to 4, the container 12 has a receptacle portion 20 supported by legs 21. The front legs 21 are labeled as 21F in the figures while the rear legs are labeled as legs 21R. The legs 21 raise the receptacle portion 20 such that an undersurface of the receptacle portion 20 is spaced from the ground, thereby defining a tunnel (i.e., passage) for the vehicle 14 to be inserted thereunder, as shown in FIGS. 1 and 2. Reference is made hereinafter to the front and the rear of the vehicle 14 and of the system 10. The front is the leading end of the vehicle 14 relative to a coupling direction of the vehicle 14, the direction being illustrated as F in FIGS. 1 and 2. The rear of the vehicle 14 is thus the trailing end of the vehicle 15 relative to the coupling direction.

As shown in FIGS. 3 and 4, the container 12 has a channel 22 defined in the underside. The channel 22 may be open-ended at both ends (as shown in FIGS. 3 and 4), or open-ended at a single end. The channel 22 is centrally located in the receptacle portion, and extends from the front to the rear of the container 12.

Despite the receptacle portion 20 being shown as having a relatively high sidewall, the receptacle portion 20 may be of smaller volume to limit the volume of material it can accommodate (to avoid overloading). A load cell may be on the vehicle 14 as well to weigh the material received in the receptacle portion 20. It is observed that the receptacle 20 is open-ended with a front spout portion, among numerous other design possibilities. Moreover, the cavity of the receptacle portion 20 may flare slightly towards the open top. Accordingly, containers 12 may be stacked into one another.

As observed from FIGS. 1 and 2, the vehicle 14 is positioned under the container 12 from the rear to the front. As seen in FIGS. 2 and 3, the container 12 has connector tabs 23 adjacent to the rear legs 21R. Although a pair of the connector tabs 23 are shown a single connector tab 23 could be used to connect the container 12 to the lift interface device 16, as described hereinafter.

The connector tabs 23 are typically reinforced or robust walls capable of sustaining a fair amount of pressure. The connector tabs 23 are generally parallel and spaced apart from one another, thereby forming a gap therebetween. In the embodiment of FIGS. 2 and 3, the gap between the connector tabs 23 is opened to the rear of the vehicle. The connector tabs 23 each have a pin hole 24. The pin holes 24 are adapted to receive a pin which will attach the container 12 to the lift interface device 16 on the vehicle 14, enabling the tilting of the container 12 relative to the vehicle 14 as described hereinafter.

In the embodiment of FIG. 3, the connector tabs 23 are anchored to an L-shaped bracket 25 (a.k.a., angle bar), for instance as an integral welded part. The bracket 25 is fixed (e.g., bolted, fastened, glued, etc) to corresponding surfaces of the container 12. This arrangement constitutes one of numerous solutions considered to secure the connector tab(s) 23 to the receptacle portion 20.

Figure 6:
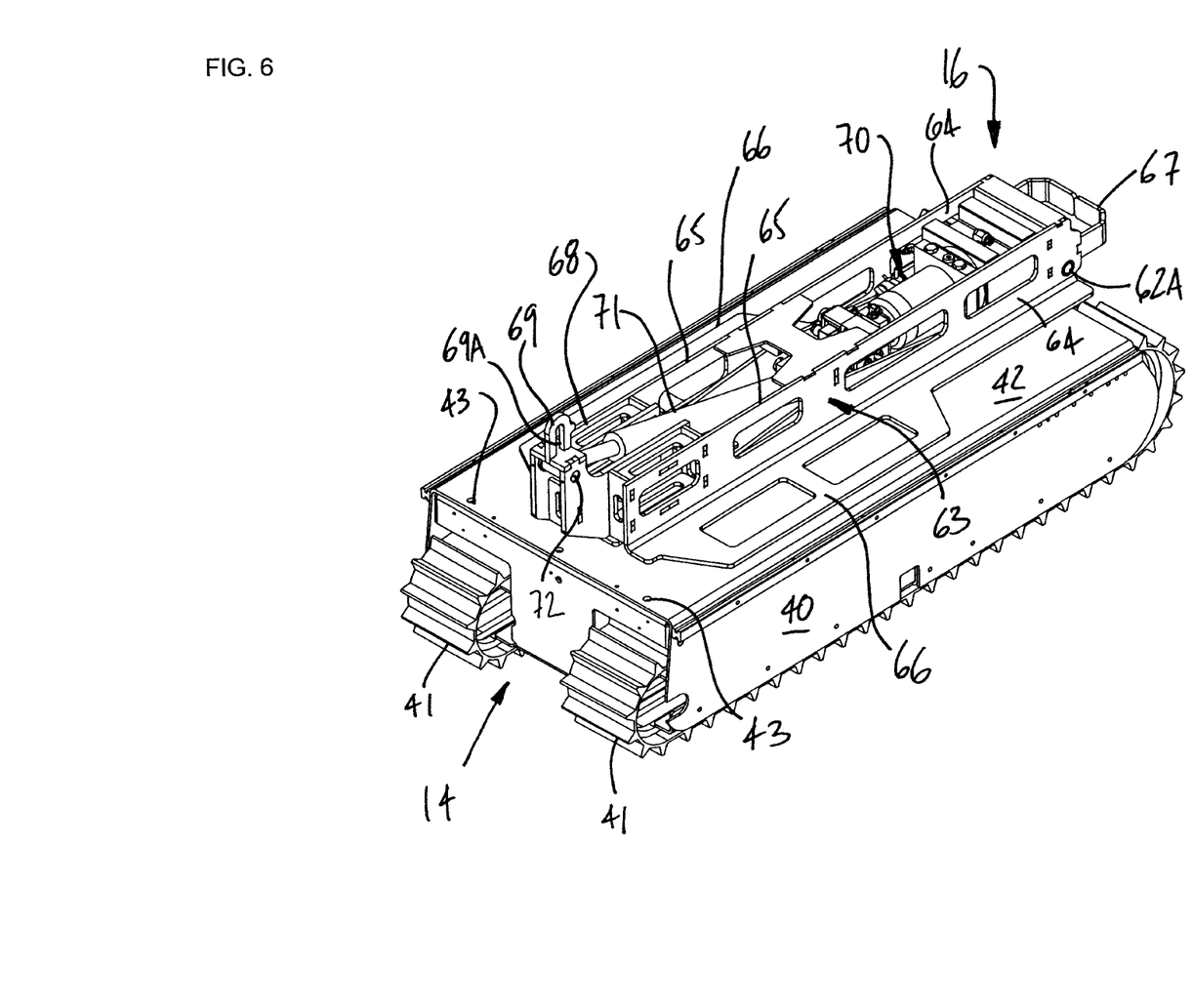
FIG. 6 is a perspective view of a vehicle with lift interface device of the motorized container system of FIG. 1, from a trailing end.
Figure 7:
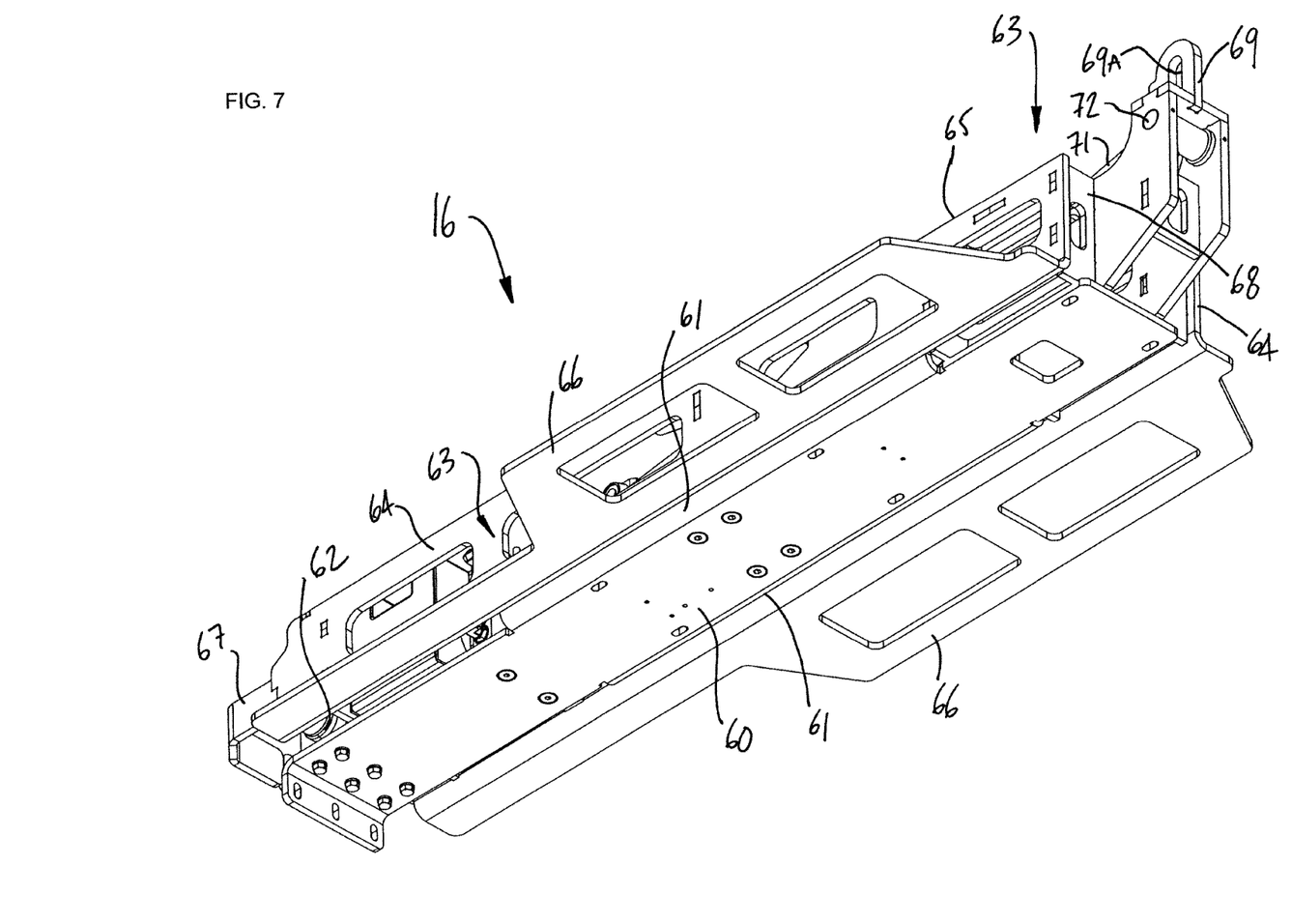
FIG. 7 is an underside perspective view of the lift interface device of FIG. 5.

Referring to FIGS. 3, 6 and 7, the vehicle 14 is shown having a body 40 motorized by a pair of tracks 41. The vehicle 14 is shown as an example of one of numerous types of vehicles that may be used with the system 10 of the present disclosure. The body 40 encloses the motorization equipment of the vehicle 14, to power the tracks 41. The motorization equipment may include electric motors, battery, a transmission, gear boxes, as well as a controlling unit to operate the vehicle 14, and a telecommunications unit (e.g., wireless) associated with a remote control.

The body 40 is of low profile, as a top surface 42 is at a height of 13 ½"±1 ½" from the ground, as it will be movable, so as to be displaceable into a supporting position under the container 12, via the tunnel defined by the lets 21 raising the receptacle portion 20 from the ground. The top surface 42 comprises connection holes 43 (e.g., tapped), by which components may be fixed to the top surface 42. As described hereinafter, the lift interface device 16 may be bolted to the top surface 42.

Figure 8:
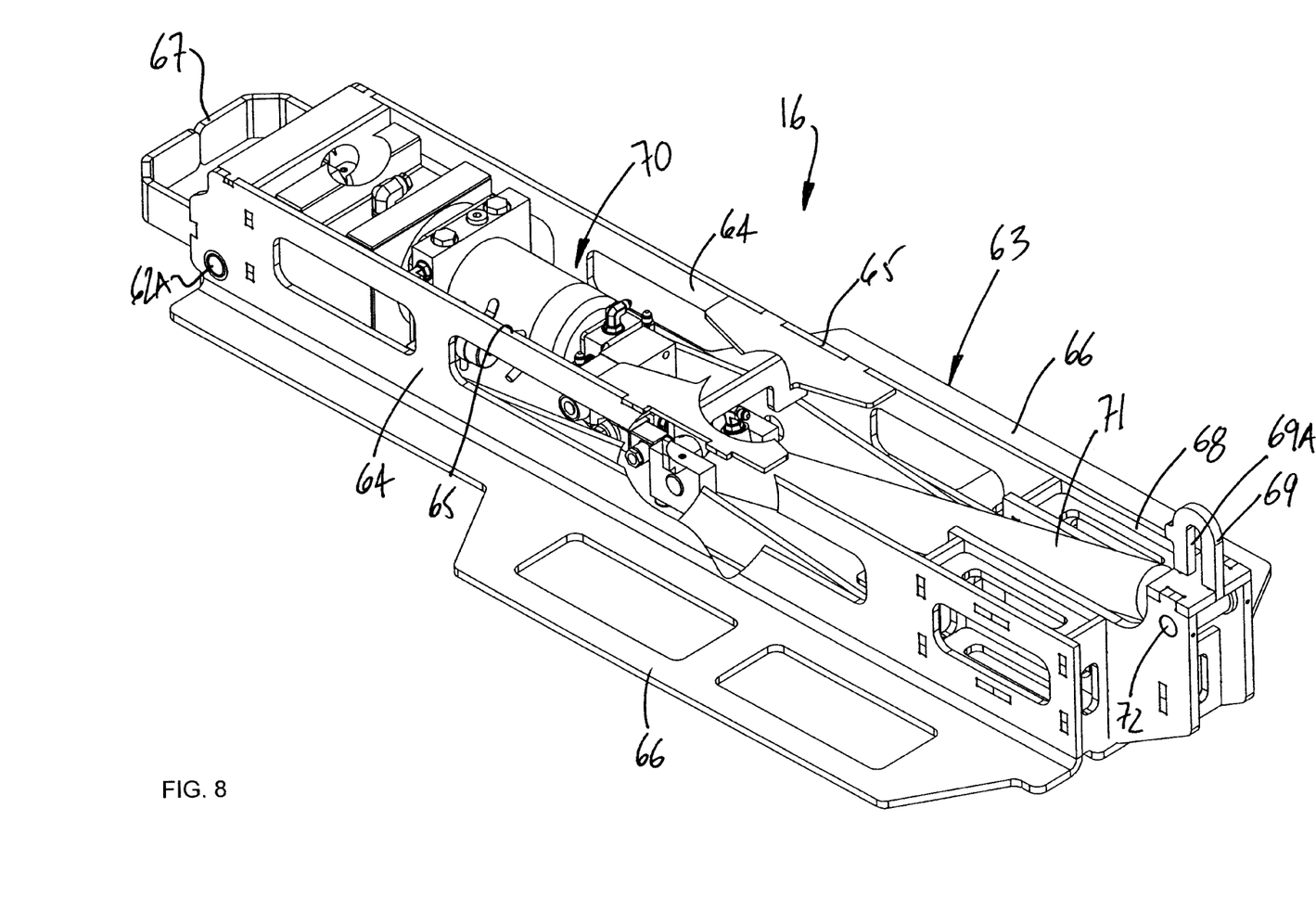
FIG. 8 is a top side perspective view of the lift interface device of FIG. 5.
Figure 9:
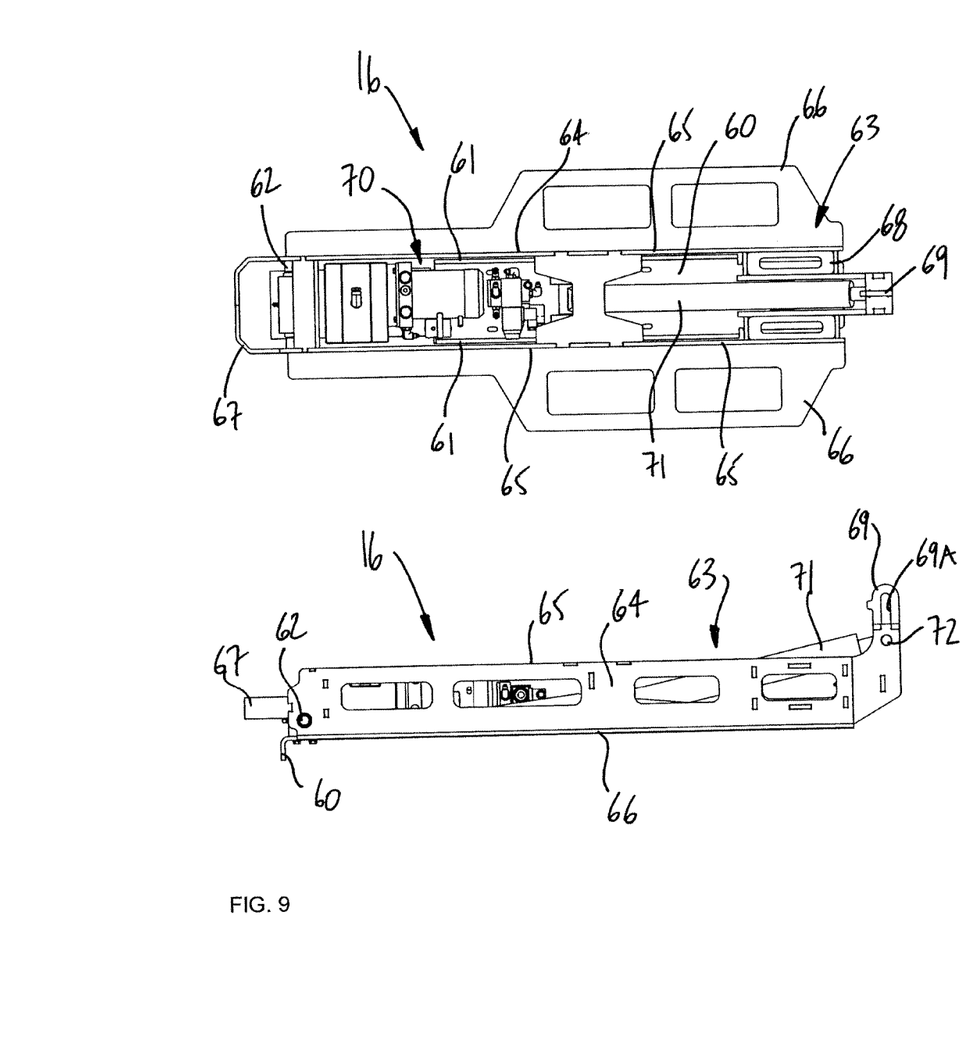
FIG. 9 shows a top plan view and side elevation view of the lift interface device of FIG. 5.
Figure 10:
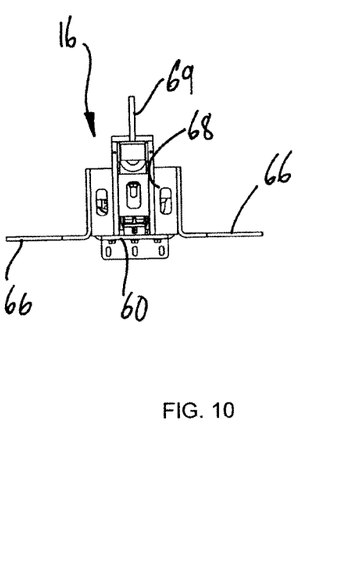
FIG. 10 is a rear elevation view of the lift interface device of FIG. 5.
Figure 11:
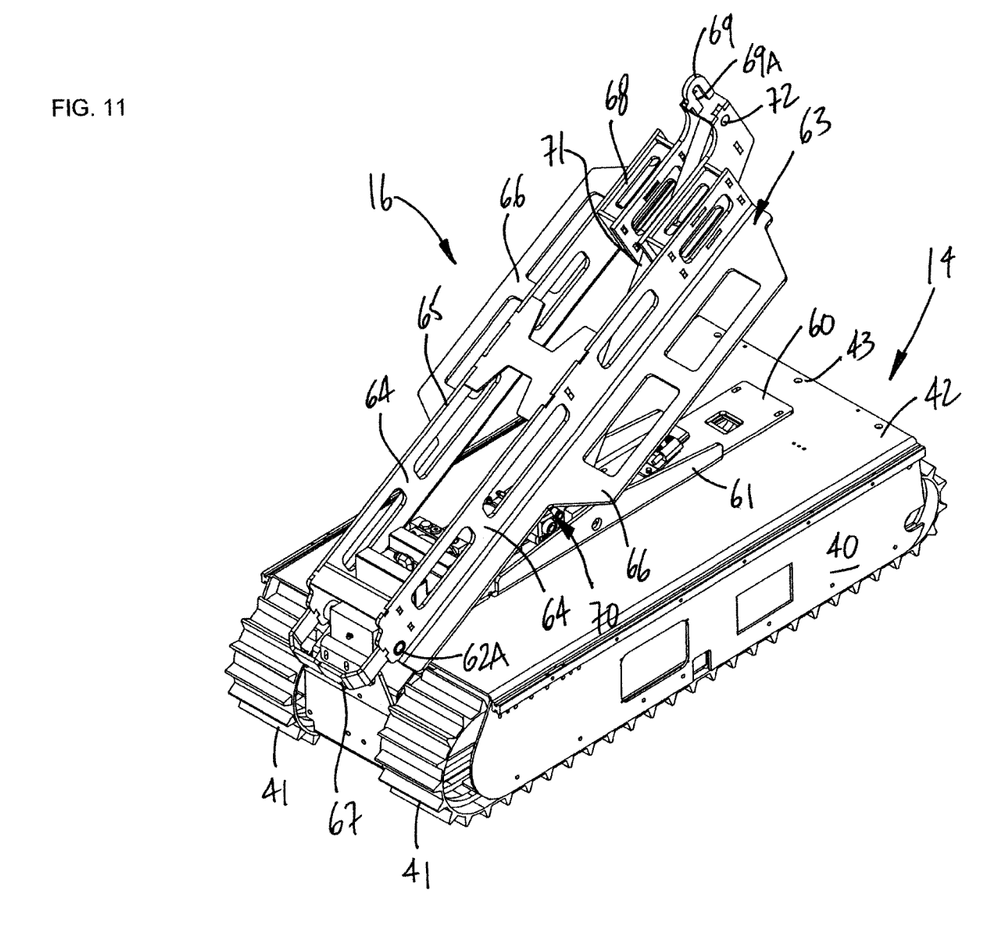
FIG. 11 is a perspective view of the vehicle with the lift interface device of the motorized container system of FIG. 5, from a leading end and with the lift interface device in a raised orientation.
Figure 12:
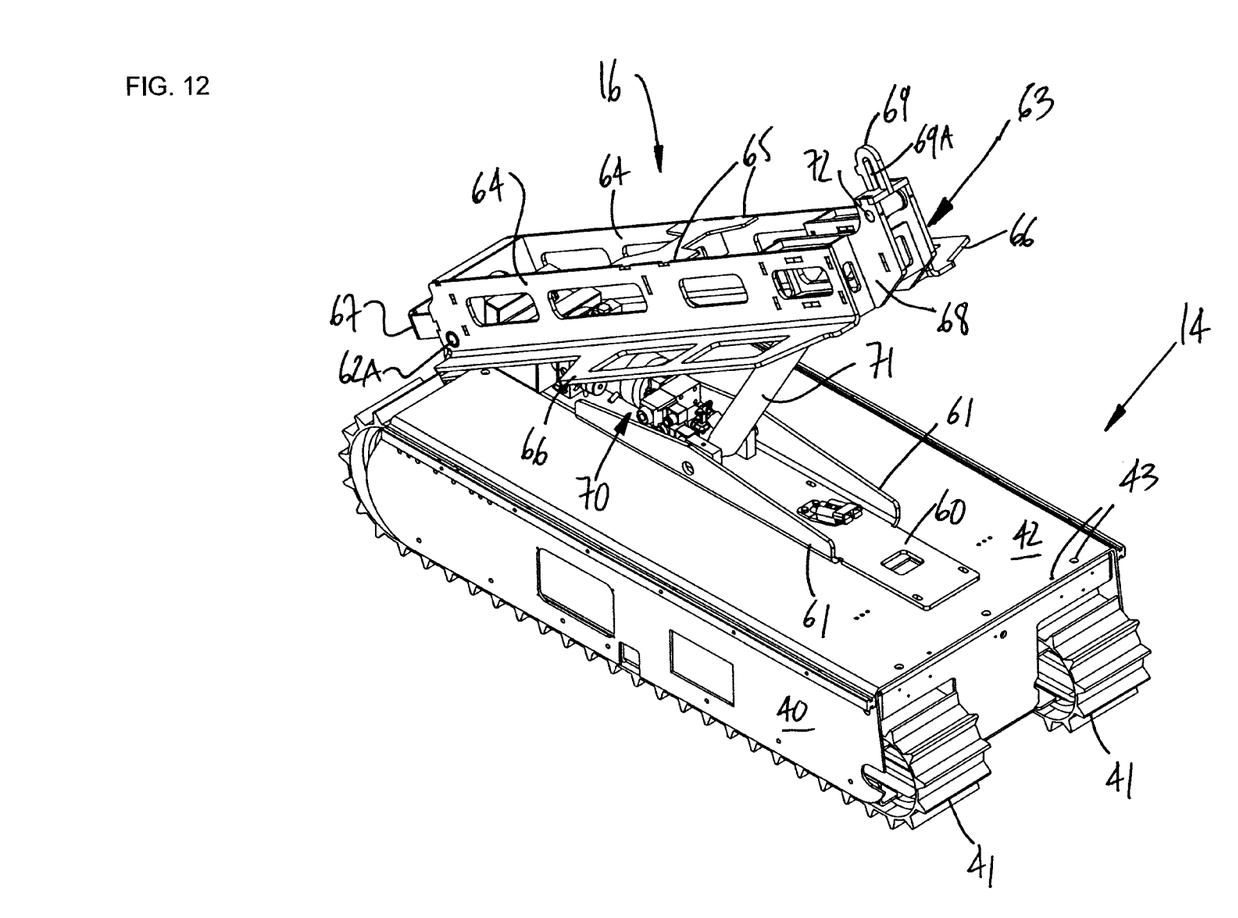
FIG. 12 is a perspective view of a vehicle with lift interface device of the motorized container system of FIG. 11, from a trailing end.

Referring now to FIGS. 5 to 12, the lift interface device 16 is shown in greater detail. The device 16 has a base 60, by which it is secured to the top surface 42 of the vehicle 14. The base 60 is a plate may be fixed by way of releasable fasteners such as bolts, or the like. In such an embodiment, the device 16 may be a single transportable unit, that may be installed on different types of vehicles. According to another embodiment, the device 16 is integrally connected to the vehicle 14, and in such a case the base 60 and the top surface 42 may be a single integral component. As seen in FIGS. 8, 11 and 12, walls 61 project upwardly from the base 60. The base plate of the base 60 and the walls 61 may be a single bracket, or may be connected together. The walls 61 are used as a pivot base for a cylinder, as described hereinafter, and alternatives to walls may be used as well, such as a pivot block connected directly to the base. The base 60 further comprises a pivot block 62, positioned adjacent to or at a front end of the vehicle 14. The pivot block 62 may have any appropriate configuration. For instance, the pivot block 62 may be an extension of the walls 61, etc, and comprises a pivot 62A.

A pivotable frame 63 is pivotally connected to the base 60, at the pivot block 62, by the pivot 62A. Additional joints may also be provided, for instance to provide translation as well. In the illustrated embodiment, however, a single rotational degree of freedom is provided between the frame 63 and the base 60, by the pivot 62A. Therefore, the pivotable frame 63 may be in the coupling orientation shown in FIGS. 5 to 10, in which the pivotable frame 63 is against the base 60 and/or against the top surface 42 of the vehicle 14, and may be pivoted to a raised orientation, as shown in FIGS. 11 and 12, and any orientation between the coupling orientation and the raised orientation. It is pointed out that FIGS. 11 and 12 do not necessarily illustrate the maximum inclination of the frame 63 relative to the base 60. According to an embodiment, the frame 63 is movable from 0 to 62 degrees, although this range may be greater.

Although the system 10 may come in different dimensions, it is considered to provide the container with a width of a maximum of 36", to allow same to be transported through industrial doors. For such a dimension, the vehicle 14 may have a maximum width of 29 ½"+0"−2". In the illustrated embodiment, the length of the vehicle 14 may be of 66"±3", and with a height of 13 ½"±1 ½" (excluding the lift interface device 16).

The frame 63 has a pair of longitudinal walls 64. In an embodiment, the walls 64 are generally vertical spaced apart to define an inner volume therebetween. The inner volume is sized to receive most other components of the lift interface device 16, as shown in FIG. 10. The walls 64 have top edges 65 (forming support surfaces for the container 12). The edges 65 are generally parallel to one another as held by transverse structural members, and lie in a plane that is generally parallel to the top surface 42, when the frame 63 is in the coupling configuration. Support flanks 66 project laterally from the bottom of the walls 64, and will provide additional support surface for the container 12 lifted by the device 16. The support flanks 66 may be a bent continuation of the walls 64, or may be integrally connected to the walls 64, among other possibilities. A top surface of the support flanks 66 may also be generally parallel to the top edges 65. In another embodiment, the frame 63 does not have support flanks.

The frame 63 further comprises an alignment head 67 at its front end. The alignment head 67 is illustrated as being a single bar or two bars having two longitudinal portions extending from a remainder of the frame 63, a transverse portion, and chamfer portions interrelating the longitudinal portions to the transverse portions. In other words, the alignment head 67 narrows in a forward or leading direction. The alignment head 67 will facilitate the coupling of the container 12 and vehicle 14, as will be described hereinafter.

Referring to FIGS. 5 to 12, a connection block 68 is provided at a tail end of the frame 63. The connection block 68 consists of various strengthening members from which projects rearwardly and upwardly a connector tab 69, with pin hole 69A, for connection with the connector tabs 23 of the container 12. The connection block 68 also serves as a pivot support for a cylinder 71 of an actuation unit 70, for a pivot 72. It is observed that an axis of the pivot 72 may be above a plane of the top edges 65, as illustrated in FIG. 8. Suitable dimensions for the lift interface device 16 are a height of 6 ¼"±1", a width of 8 ⅞"±1" for the frame 63 (for a ratio of 2.78 and 3.75 for a width of the vehicle 14 on a width of the frame 63), and a length of 52"±3" for the top edges 65, in support of the dimensions provided above for the vehicle 14. Hence, the top height of the vehicle 14 with the lift interface device 16 in its coupling orientation may be slightly below 20" (at 19 ¾"±2 ½").

The actuation unit 70 is shown as an hydraulic unit that may comprise the necessary hydraulic equipment to actuate the cylinder 71, including an hydraulic pump, manifold, valves, and fluid lines, most of which may be lodged in the inner volume of the frame 63. The cylinder 71 is a telescopic cylinder, but may be any other type of cylinder such as a standard shaft-and-housing piston cylinder, a linear actuator, etc, as a function of loads for which the system 10 is specified. Although the unit 70 is described as being hydraulic, any other appropriate type of actuation may be used, such as electrical or pneumatic actuation, or manually-operated hydraulics. Moreover, the unit 70 may be operated using the power source and controller commands of the vehicle 14, such that a single remote control may be used to operate the vehicle 14 and actuate the cylinder 71.

Therefore, in operation, the containers 12 may be provided as a set or kit with a single one of the vehicles 14 to move the containers 12 around. The container 12 is shown in FIG. 1 as being useable for instance to receive materials. More specifically, the frequency at which the containers 12 must be maneuvered may be relatively low, whereby institutional use may be of a shared vehicle 14 for numerous containers 12. The use of the vehicle 14 is therefore maximized by being shared with a kit of containers 12, with the containers 12.

Referring to FIGS. 1 and 2, there is shown how the vehicle 14 is inserted under the container 12. In order for the vehicle 14 to be coupled to the container 12, the lift interface device 16 must be in the coupling orientation (e.g., FIGS. 5 and 6).

The vehicle 14 is moved in the forward direction F toward a rear/tail end of the container 12, with the body 40 aligned with the tunnel of the container 12. The vehicle 14 and the container 12 may not be perfectly aligned—the vehicle 14 must be oriented such that the alignment head 67 of the device 16 penetrates the channel 22 in the underside of the container 12. The chamfering shape of the alignment head 67 will ease the penetration of the frame 63 in the channel 22. If the container 12 is loaded, the vehicle 14 will align itself with the container 12 by the sliding cooperation between the frame 63 and the channel 22. If the container 12 is not loaded and/or on a low-friction surface, the container 12 will align itself with the vehicle 14, as guided by the sliding cooperation between the frame 63 and the channel 22. It is pointed out that the channel 22 has slightly larger sectional dimensions than the frame 63, the play therebetween enabling the self-alignment feature described above. Moreover, the top edges 65 of the frame 63 may be lower that the horizontal surface of the channel 22, so as to avoid any friction between the channel 22 and the frame 63 during the coupling operation.

Referring to FIG. 2, the vehicle 14 reaches a position relative to the container 12, at which the connector tab 69 of the device 16 is aligned with the connector tabs 23 of the container 12. As the connector tab 69 projects above the top edges 65, the connector tab 69 may abut against the end of the gap between the tabs 23 (i.e., bracket 25), preventing the vehicle 14 from moving forward relative to the container 12. During this operation, the user should control the actuation of the vehicle 14 to stop the forward movement of the vehicle when the tabs 23 and 69 are aligned. A pin 80 (FIG. 2) may then be inserted in the aligned holes 24 and 69A. The pin 80 should be sized so as to enable manual insertion into the holes 24 and 69A of the connector tabs 23 and 69, respectively, while being snuggly received (with little play) relative to a surface of the holes 24, 69A. It is considered to provide temporary locking system such as plugs to block to the free ends of the pins 80.

Once the pin 80 blocks the tabs 23 and 69 together, the container 12 may be raised, by actuation of the cylinder 71. As mentioned above, with the top edges 65 of the frame 63 being lower than the horizontal surface of the channel 22, it may be necessary to raise the container 12 for the vehicle 14 to displace the container 12. For the raising of the container 12, the frame 63 may be inclined by a small angle (e.g., approximately 5 degrees), just enough for the legs 21 of the container 12 to be off the ground. According to an embodiment, the controller of the device 16 may be connected to a sensor (e.g., optical sensor) that may indicate when an appropriate angle is reached for the vehicle 14 to move around with the container 12 thereon in the manner shown in FIGS. 1 and 2.

If it is desired to further tilt the container 12 (e.g., to the angles of the frame 63 shown in FIGS. 11 and 12), the cylinder 71 is actuated. The tilt angle of the container 12 is augmented by increasing the length of the cylinder 71. The hydraulic unit 70 may be selected so as to hold an hydraulic pressure in the hydraulic circuit, such that the frame 63 may hold the loaded container 12 in a tilted configuration, at desired orientations. It is pointed out that appropriate sensors may be provided on the vehicle 14 to ensure that the container system 10 does not tip over.

The pin 80 in the tabs 23 and 69 and the frictional forces between the receptacle portion 20 and the frame 63 (e.g., including with the support flanks 66 if present) ensure that the container 12 remains on the frame 63, provided that the load in the container 12 is within acceptable thresholds.

To decouple the container 12 from the vehicle 14, the frame 63 is pivoted to its coupling position (FIGS. 5 and 6), the pin 80 (FIG. 2) is removed, and the vehicle 14 may be displaced in the rearward direction, i.e., backed away from the vehicle.

It is observed that the longitudinal contact surfaces of the frame 63 with the container 12 are the top edges 65. In an embodiment, on a flat, smooth surface, the coupling movement of the vehicle 14 into the container 12 will have little or no contact between the top edges 65 and the horizontal surface of the channel 22. If there is contact, the top edges 65 represent a small surface, minimizing friction between the device 16 and the container 12. Once the container 12 is raised, the elastic deformation of the container 12 will have same rest against the support flanks 66.

As mentioned previously, the container 12 may have a standard hopper shape, but may also be a low profile hopper shape, a pallet style base. The system 10 may conveniently bring heavy tools to a construction site. For instance, the container 12 may be a table upon which a piece of equipment is permanently installed.

The invention claimed is:

1. An assembly comprising:
a container having a receptacle portion and legs projecting downwardly from the receptacle portion to define a passage, an undersurface of the receptacle portion defining a channel aligned with the passage, the channel having an open end at least at one end thereof;
a lift interface device having a base adapted to be handled by a vehicle, a frame connected to the base with a rotational joint adjacent to a leading end of the frame, such that the frame is movable in a single rotational degree of freedom relative to the base from a coupling orientation to a raised orientation, the frame defined by the leading end and a trailing end delimiting extremities of the frame, at least one support surface configured for supporting the container lying on the at least one support surface when the frame is rotated toward the raised orientation, a container connector at the trailing end of the lift interface device adapted to be used for releasably connecting the container to the frame when the frame is rotated toward the raised orientation, a portion of the frame being defined by walls extending longitudinally such that a width of the portion of the frame is less than the width of said channel, the portion of the frame forming the leading end of the frame configured for entering the channel of the container through the at open end of the channel, whereby the frame at a level of the portion extends from the leading end to the container connector, with the leading end from its leadingmost portion having a width that is less than the width of the channel, such that the portion of the frame, in the coupling orientation, is configured for entering the channel of the container and for moving along the channel of the container, and an actuation unit to rotate and hold the frame relative to the base at desired orientations between the coupling orientation and the raised orientation.

2. The assembly according to claim 1, wherein the walls of the lift interface device are a pair of longitudinal vertical walls spaced apart by transverse members.

3. The assembly according to claim 2, wherein the at least one support surface is a top edge surface of each of the longitudinal vertical walls, the top edge surfaces configured to support in lying contact the container in the raised orientation.

4. The assembly according to claim 2, further comprising support flanks projecting laterally from the longitudinal vertical walls below said portion of the frame and away from one another, the support flanks included in the at least one support surface so as to be to support in lying contact the container in the raised orientation.

5. The assembly according to claim 4, wherein an undersurface of the support flanks is coplanar with a top surface of the vehicle in the coupling orientation.

6. The lift assembly according to claim 4, wherein the support flanks are each part of an integral metal piece with one of the longitudinal vertical walls.

7. The lift assembly according to claim 2, wherein an inner volume is defined between the longitudinal vertical walls, the inner volume accommodating at least a substantial portion of the base and of the actuation unit in the coupling orientation.

8. The assembly according to claim 1, wherein a width of the vehicle is at a ratio between 2.78 and 3.75 to said width of the portion of the frame.

9. The assembly according to claim 8, wherein the frame has the width of 8 7/8"±1".

10. The assembly according to claim 1, further comprising an alignment head forming the leading end of the frame at the portion of the frame, the alignment head having a body narrowing in the leading direction and adapted to contact a channel of the container for the portion of the frame to align with the channel.

11. The assembly according to claim 10, wherein the alignment head is connected to the frame.

12. The assembly according to claim 1, wherein the container connector is a tab with a hole.

13. The assembly according to claim 12, wherein the tab is above a plane of the at least one support surface and is between planes of the walls.

14. The assembly according to claim 12, wherein the tab is a trailing-most member of the lift interface device.

15. The assembly according to claim 1, wherein the actuation unit comprises a hydraulic cylinder with a hydraulic network and pump, the base, the hydraulic cylinder, the hydraulic network and the pump being substantially accommodated in an inner volume of the frame.

16. A container system comprising:
the assembly according to claim 1;
the vehicle supporting the lift interface device.

17. The container system according to claim 16, wherein the raised orientation has the frame at an angle of 62 degrees relative to a top planar surface of the vehicle.

18. The container system according to claim 16, wherein the vehicle has a height of 13 1/2"±1 1/2" from the ground.

19. The assembly according to claim 1, wherein the legs of the container remain on the ground when the vehicle is in the passage and the lift interface device is in its coupling orientation, when the container system is on a substantially planar surface.

20. The assembly according to claim 1, the container comprising a lift connector for cooperation with the container connector of the frame.

21. The assembly according to claim 20, wherein the lift connector is at least one connector tab with a hole, the lift connector being located at a trailing end of the channel in the receptacle portion.

22. The assembly according to claim 21, wherein the connector tab of the lift connector is above an uppermost horizontal surface of the channel, and the tab of the container connector is above a plane of the at least one support surface of the frame and is between planes of the walls.

* * * * *